Patented Nov. 21, 1939

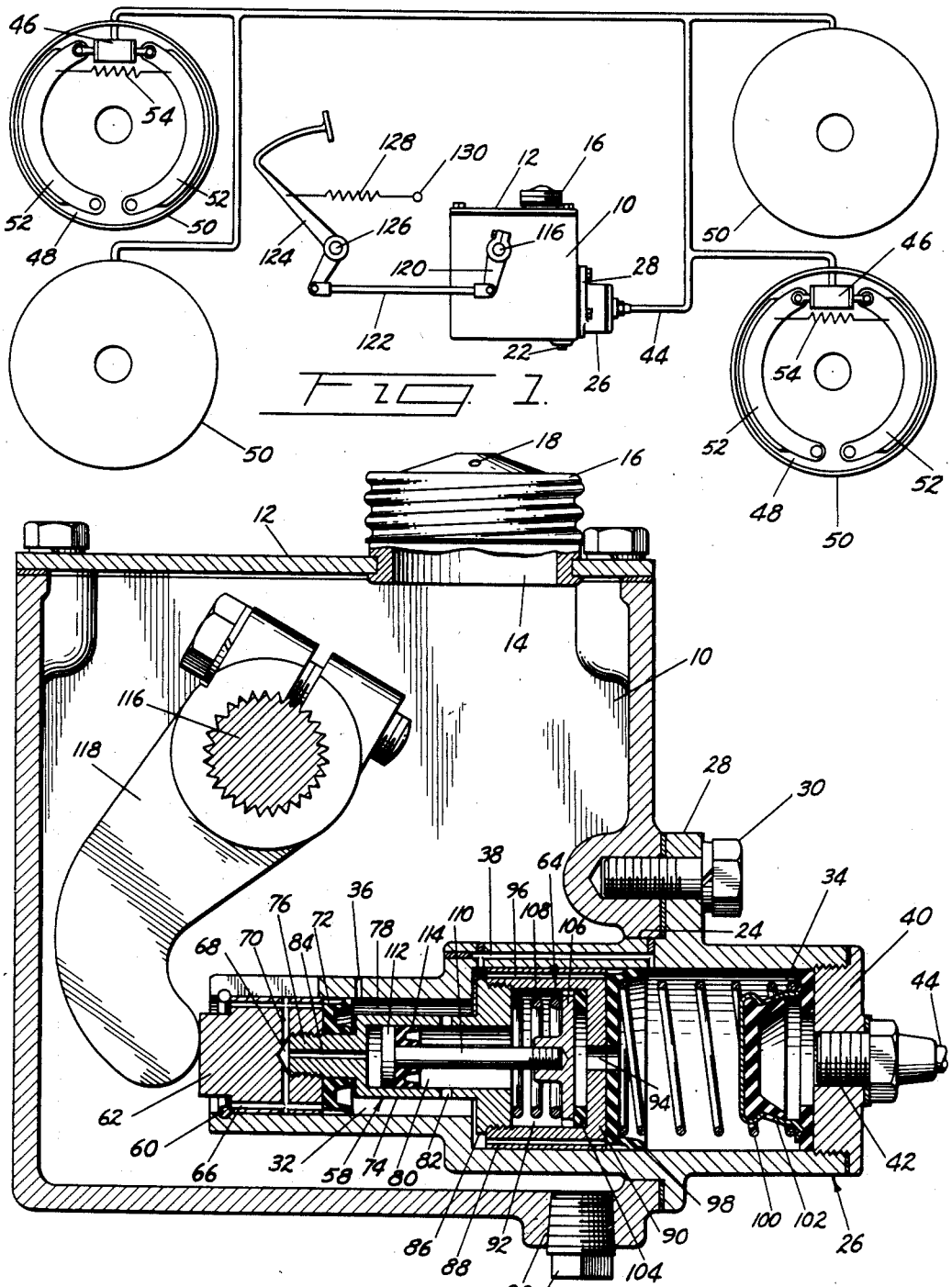

2,180,454

UNITED STATES PATENT OFFICE 2,180,454

FLUID PRESSURE BRAKING SYSTEM

Herbert C. Bowen, Detroit, Mich., assignor to Hydraulic Brake Company, Detroit, Mich., a corporation of California Application May 12, 1937, Serial No. 142,165

7 Claims. (Cl. 60—54.6)

This invention relates to fluid pressure braking systems, and more particularly to fluid pressure producing devices for such systems.

An object of the invention is to provide a fluid pressure producing device wherein the pressure may be stepped up from a low to a relatively high pressure without appreciable loss of pressure and without proportionate increase of the applied operating force.

Another object of the invention is to provide a fluid pressure producing device operative to step up pressure from a low pressure to a relatively high pressure and to effect the transition from low to high pressure with spasmodic resistance.

Other objects of the invention will become apparent from the ensuing description of a preferred embodiment thereof and from the accompanying drawing, in which, Fig. 1 is a diagrammatical illustration of a fluid pressure braking system embodying the invention; and Fig. 2 is a vertical, sectional view of the pressure producing device connected in the system.

Referring to the drawing, 10 represents a fluid reservoir having a removable top 12 provided with a filling opening 14 which may be closed as by a cap 16 having suitable openings 18 for venting the reservoir to the atmosphere. The reservoir also has a drain opening 20 normally closed as by a plug 22 and arranged in the wall of the reservoir adjacent the bottom of the reservoir is an opening 24.

A cylinder 26 fitted in the opening 24 has a radial flange 28 abutting the wall of the reservoir and secured thereto as by bolts 30 so as to support the cylinder in parallel relation to the bottom of the reservoir and partly within and partly outside the reservoir. The cylinder includes a small chamber 32 and a large chamber 34 arranged concentrically to and communicating with one another. The small chamber has a port 36 providing a communication between the reservoir and the small chamber, and the large chamber has in its wall a by-pass 38. The large chamber also has a head 40 provided with a discharge port 42.

A fluid pressure delivery pipe or conduit 44 connected to the discharge port has a plurality of branches connected respectively to fluid pressure actuated motors 46 arranged in pairs, one pair for actuating the brakes associated with the front wheels of a vehicle and another pair for actuating the brakes associated with the rear wheels of the vehicle.

The brakes are preferably of conventional type each including a fixed support or backing plate 48, a rotatable drum 50 associated therewith, a pair of corresponding interchangeable frictional elements or shoes 52 pivoted on the backing plate, and a motor corresponding to the motors 46 mounted on the backing plate between the shoes and operative to actuate the shoes into engagement with the drum against the resistance of a retractile spring 54 connecting the shoes.

A compound piston 58 reciprocable in the cylinder is held against displacement by a retaining ring 60 seated in the groove in the wall of the cylinder. This compound piston includes a small piston 62 reciprocable in the small chamber 32 and a large piston 64 reciprocable in the large chamber 34. The small piston 62 has a plurality of passages 66 providing communications between the reservoir and that portion of the cylinder forward of the piston. The small piston also has an axial bore 68 and a diametral passage 70 providing communications between the axial bore 68 and at least two of the passages 66. A collapsible leak-proof cup 72 seated on the head of the piston 62 controls the passages 66 between the reservoir and the cylinder. The cup is of a conventional type having a central opening registering with the axial bore 68 in the piston.

A sleeve 74, open at one of its ends and closed at its other end, has on its closed end a shank 76 mounted in the axial bore 68, and embraced by the cup. The wall of the sleeve 74 provides in conjunction with the wall of the cylinder an annular chamber 78, and the interior of the sleeve constitutes a chamber 80. The sleeve has a plurality of ports 82 providing communications between the annular chamber 78 and the interior of the sleeve, or the chamber 80, and a passage 84 in this shank 76 provides a communication between the chamber 80 and the diametral passage 70 in the small piston 68.

The sleeve 74 has at its open end a radial flange 86 supporting the large piston 64 in the large chamber 34. This large piston includes a shell 88 closed at one of its ends as by a head 90 and open at its other end. The open end has suitably secured therein the radial flange 86. This shell provides a chamber 92 concentric to and in direct communication with the chamber 80 in the sleeve, and an axial port 94 in the head 90 of the shell provides a communication between the chamber 92 and that portion of the chamber 34 forward of the large piston 64. The shell also has a plurality of longitudinal passages 96 in its wall providing communications between the annular chamber 78 and that portion of the chamber 34 forward of the large piston 64. A collapsible leak-proof cup 98 having a central orifice registering with the port 94 is seated on the head 90 of the large piston for control of the passages 96, and a spring 100 interposed between the cup and a two-way valve 102, seated on the head 40 for control of the discharge port 42, retains the cup and valve against displacement and also serves to return the piston to its retracted position.

Positioned on the back of the head 90 of the piston 64 is a sealing ring 104 providing a seat for a valve 106 for controlling the port 94. The valve is urged to its seat by a heavy spring 108 interposed between the back of the valve and the flange 86 on the sleeve, and the valve has a stem 110 provided with a head 112 slidable in the chamber 80, and seated on the head 112 is a leak-proof cup 114 providing against the seepage of fluid past the head 112.

A transverse shaft 116 suitably mounted in the oppositely disposed walls of the reservoir 10 has thereon within the reservoir an actuator 118 engaging the piston 62, and suitably secured to the shaft outside of the reservoir is an arm 120 connected as by a rod 122 to a foot pedal lever 124 pivotally mounted on a stub shaft 126 and connected by a retractile spring 128 to a fixed support 130.

In a normal operation, upon depressing the foot pedal lever 124 force is transmitted therefrom through the linkage 122, 120, 116 and 118 to the piston 58, resulting in moving the piston on its compression stroke. During the initial movement of the piston on its compression stroke, the cup 72 on the small piston 62 covers the port 36 and the cup 98 on the large piston 64 closes the by-pass 38.

Thereafter, as the piston moves on its compression stroke the pressure in the small chamber 32 drops to sub-atmospheric. This results in drawing fluid from the reservoir through the passages 66 past the cup 72 into the small chamber 32, completely filling this chamber, and during this period the pressure on the fluid in the large chamber 34 is gradually building up.

The pressure in the large chamber is received by the head 90 of the piston 64 and by the valve 106 normally held closed by the spring 108. When the pressure on the fluid in the large chamber 34 reaches a degree sufficient to overcome the load on the spring 108, the valve 106 opens. This results in a partial release of pressure on the fluid in the large chamber 34 and the return of a small quantity of fluid from the large chamber 34 to the small chamber 32 by way of the port 94, past the valve 106, through the chamber 80 and ports 82 into the chamber 32, resulting in equalizing the pressure in the chambers 32 and 34.

The pressure on the fluid in the chambers 32 and 34 is received by the head of the small piston 62 and the head 112 on the stem 110 of the valve 106. The pressure on the head 112 is insufficient to overcome the load on the spring 108, and accordingly the valve 106 closes and shuts off communication between the large chamber and the small chamber, trapping fluid in both chambers under substantially the same pressure.

Upon further movement of the piston on its compression stroke, the pressure on the fluid in the large chamber 34 increases and the pressure on the fluid in the small chamber 32 decreases; and when the pressure on the fluid in the large chamber again reaches a pressure sufficient to overcome the load on the spring 108, the valve 106 again opens and relieves the pressure in the large chamber 34 and establishes communication between the large and small chambers.

This operation is repeated as the piston advances on its compression stroke, and at each repetition the valve 106 opens at a higher pressure, due to an increase of pressure in the small chamber 32 acting on the valve 106 and augmenting the load on the spring 108, and when the pressure on the fluid in the small chamber 32 acting on the head 112 of the stem 110 of the valve 106 is sufficient to overcome the load on the spring 108, the valve 106 is retained open, and thereafter the large piston 64 is ineffective for producing pressure. After the large piston 64 becomes ineffective for producing pressure, all of the force created by the operator on the foot pedal is transmitted to the small piston 62 which translates the force thus applied into pressure on the fluid which is effective to apply the brakes. Because of the small area of the small piston 62 and the leverage provided by the foot pedal and its associated linkage, it is possible for the operator to create a strong braking action with the exertion of only a small force on the foot pedal.

Upon completion of a braking operation, the operator releases the foot pedal level 124, whereupon the retractile spring 128 returns the foot pedal lever to its retracted position. This results in release of the piston 58 and return of the piston to its retracted position under the influence of the spring 100. As the piston returns to its retracted position a partial vacuum is created in the cylinder, resulting in drawing fluid from the reservoir, through the ports 66 in the piston 62, past the cup 72 into the small chamber 32, and thence through the passages 96 in the large piston 64 past the cup 98 into the large chamber 34, completely filling the cylinder. During this period fluid is returning to the cylinder from the fluid pressure actuated motors 46 and the conduits connecting these motors to the cylinder under the influence of the retractile springs 54 connecting the shoes of the respective brakes.

The quantity of fluid returned to the cylinder may prove to be in excess of the quantity required to completely fill the cylinder, and such excess fluid may be returned to the reservoir by way of the port 36 and the by-pass 38. At the end of this operation the device is again at rest and ready for a subsequent operation.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A fluid pressure device comprising a low pressure cylinder and a high pressure cylinder, a piston in each cylinder, a passage permitting flow of fluid past said low pressure piston, a valve for closing said passage, said valve having a face exposed to the fluid pressure in the low pressure cylinder and an opposite face exposed to the fluid pressure in the high pressure cylinder, a head having a surface exposed to the fluid pressure in the high pressure cylinder, said surface having an area less than the area of the valve face exposed to the fluid pressure in the low pressure cylinder, said head having an opposite surface exposed to substantially atmospheric pressure, and means connecting said head with said valve.

2. A fluid pressure device comprising a low pressure cylinder and a high pressure cylinder, a piston in each cylinder, a passage permitting flow of fluid past said low pressure piston, a valve for closing said passage, said valve having a face exposed to the fluid pressure in the low pressure cylinder and an opposite face exposed to the fluid pressure in the high pressure cylinder, a head having a surface exposed to the fluid pressure in the high pressure cylinder, said surface having an area less than the area of either of said valve faces, said head having an opposite surface exposed to substantially atmospheric pressure, and means connecting said head with said valve.

3. A fluid pressure producing device comprising a reservoir, a cylinder supplied therefrom having a small chamber and a large chamber, said large chamber being forward of said small chamber and having a discharge port, a piston fitted for reciprocation in each of the chambers, a sleeve connecting the pistons having a port providing a communication between the sleeve and the chambers, a valve in the head of the piston in the large chamber, a stem on the valve, and a head on the stem reciprocable in the sleeve, said valve having an area exposed to the large chamber greater than the area of said head.

4. A fluid pressure producing device comprising a reservoir, a cylinder supplied therefrom having a small chamber and a large chamber, said large chamber being forward of said small chamber and having a discharge port, a piston reciprocable in the small chamber having controlled passages therethrough, a piston reciprocable in the large chamber having controlled passages therethrough and a port in its head, a sleeve connecting the pistons having a port providing a communication between the sleeve and the chambers, a valve controlling the port of the piston in the large chamber, a stem on the valve, and a head on the stem reciprocable in the sleeve, said valve having an area exposed to the large chamber greater than the area of said head.

5. A fluid pressure producing device comprising a reservoir, a cylinder supplied therefrom having a small chamber and a large chamber, said large chamber being forward of said small chamber and having a discharge port, a piston movable in the small chamber having passages therethrough, means on this piston controlling the passages therein, a piston movable in the large chamber having passages therethrough and a port, means on this piston controlling the passages therein, a sleeve connecting the pistons having a port providing a communication between the sleeve and the chambers, a spring-pressed valve controlling the port of the piston in the large chamber, a stem for the valve, and a head on the stem fitted for reciprocation in the sleeve, said valve having an area exposed to the large chamber greater than the area of said head.

6. A fluid pressure producing device comprising a reservoir, a cylinder supplied therefrom having a small chamber and a large chamber forward of the small chamber, said large chamber having a discharge port, a piston reciprocable in the small chamber having passages therethrough providing communications between the small chamber and the reservoir, means carried by this piston controlling the passages therein, a piston reciprocable in the large chamber having passages therethrough and a port in its head, means carried by this piston controlling the passages therein, a spring-pressed valve in the piston in the large chamber having a stem extending into the sleeve, and a head on the stem reciprocable in the sleeve, said valve having an area exposed to the large chamber greater than the area of said head.

7. A fluid pressure producing device comprising a reservoir, a cylinder supplied therefrom having a small chamber opening into the reservoir and a large chamber forward of the small chamber, said large chamber being provided with a discharge port, a piston reciprocable in the small chamber having spaced passages therethrough providing communications between the small chamber and the reservoir and a diametral passage connecting at least two of the spaced passages, means carried by this piston for controlling the communications between the small chamber and the reservoir, a hollow piston reciprocable in the large chamber having passages through its wall providing communications between the small and large chambers and a port in its head, means carried by this piston for controlling the passages therein, a sleeve connecting the pistons communicating with the diametral passage of the piston in the small chamber and with the hollow piston and a port in the sleeve providing a communication between the sleeve and the small and large chambers, a spring-pressed valve in the hollow piston controlling the port in the head thereof, a stem for the valve, and a head on the stem reciprocable in the sleeve, said valve having an area exposed to the large chamber greater than the area of said head.

HERBERT C. BOWEN.